United States Patent

Ilzig et al.

[11] Patent Number: 5,909,789
[45] Date of Patent: Jun. 8, 1999

[54] HUB BODY FOR CLUTCHES, ESPECIALLY FRICTION CLUTCHES IN MOTOR VEHICLES

[75] Inventors: Frank Ilzig, Schweinfurt; Ernst Buberl, Obbach; Achim Link, Schweinfurt, all of Germany

[73] Assignee: Mannesmann Sachs AG, Schweinfurt, Germany

[21] Appl. No.: 08/972,556

[22] Filed: Nov. 18, 1997

[30] Foreign Application Priority Data

Nov. 22, 1996 [DE] Germany .............................. 196 48 414
Jun. 7, 1997 [DE] Germany ........................ 296 22 915 U
Jun. 14, 1997 [DE] Germany .............................. 197 25 288

[51] Int. Cl.⁶ .............................. F16D 13/64; F16D 13/58
[52] U.S. Cl. .......................... 192/115; 192/70.16; 74/434
[58] Field of Search .............................. 192/70.16, 70.19, 192/207, 212, 115; 403/359; 74/434, 457

[56] References Cited

U.S. PATENT DOCUMENTS

| | | | |
|---|---|---|---|
| 1,868,764 | 7/1932 | Reed | 192/70.16 X |
| 2,051,915 | 8/1936 | Sykes | 74/457 X |
| 3,938,635 | 2/1976 | Davies et al. | 403/359 X |
| 4,416,564 | 11/1983 | Billet et al. | 192/207 X |
| 4,836,350 | 6/1989 | Kubel et al. | 192/212 |
| 4,966,269 | 10/1990 | Raab et al. | 192/70.16 |

FOREIGN PATENT DOCUMENTS

| | | |
|---|---|---|
| 28 19 167 | 11/1978 | Germany . |
| 40 26 765 | 2/1992 | Germany . |
| 945 445 | 1/1964 | United Kingdom . |
| 967 973 | 8/1964 | United Kingdom . |
| 1 541 213 | 2/1979 | United Kingdom . |

OTHER PUBLICATIONS

Article taken from VEB Deutscher Verlag für Grundstoffindustrie–Leipzig, 1974, entitled "Metallographie" by Hermann Schumann, pp. 255–265.

*Primary Examiner*—Richard M. Lorence
*Attorney, Agent, or Firm*—Cohen, Pontani, Lieberman & Pavane

[57] ABSTRACT

A hub body for clutches, especially friction clutches in motor vehicles, with internal toothing for connection to a gear input shaft and with at least one encircling shoulder extending radially outward or with elements spaced in the circumferential direction and extending radially and axially for connection to a take-along disk of the clutch. The hardness curve in the shoulder or in the elements rises in the axial direction, relative to a constant axial plane, from a minimum value to a maximum value and declines again, and the hardness curve declines, relative to a constant radial plane, from a maximum value on the radial inside to a minimum value on the radial outside.

17 Claims, 7 Drawing Sheets

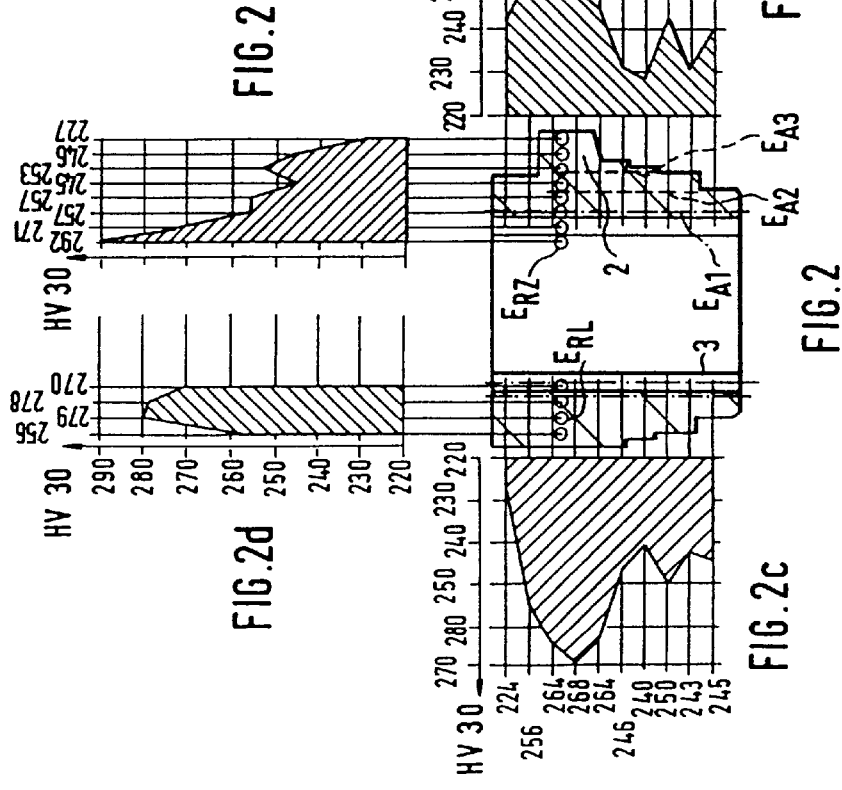

HUB BODY FOR CLUTCHES, ESPECIALLY FRICTION CLUTCHES IN MOTOR VEHICLES

BACKGROUND OF THE INVENTION

1. Field of the Invention

The invention relates to a hub body for clutches, especially friction clutches in motor vehicles. More particularly to hub body having internal toothing for connection to a gear input shaft and with at least one encircling shoulder extending radially outward or with elements spaced in the circumferential direction and extending radially and axially for connection to a take-along disk of the clutch.

2. Description of the Related Art

Hub bodies of this type are used for friction clutches that have a pre-damper. German reference DE 40 26 765 A1 discloses a clutch disk with an idle system and a load system. The internal toothing of the hub or hub body, which is equipped with external toothing for transmission of torque, is placed on the gear input shaft. A center disk (take-along disk) is connected to the hub body by the external toothing, whereby the external toothing has a rotational clearance that determines the effective area of the idle system. All components of the torsional vibration damper are arranged concentrically around the rotational axle. The center disk is connected to a lining carrier, which carries the friction linings on its external circumference, via which the torque is initiated. The torque is fed to the hub body via the external toothing, and from there to the gear input shaft via the internal toothing.

The hub body, as the final member of the power flow chain, is subjected to high loads. The teeth, as the elements transmitting torque, are known to be exposed to high surface pressure. To achieve sufficient strength and operational reliability, the hub body must be made from suitably high-tempered steel. The largest component load can be expected in the toothing. It follows that when materials are chosen, steels with strength values above the load expected in the toothing are desirable. Such materials are correspondingly expensive.

To reduce the costs when selecting materials, the hub bodies are usually hardened after forging. As a result, strength increases uniformly around the circumference of the hub body. This means, for example, that the toothing has almost the same strength to a certain radial depth at every point. Hardening a part requires a further work step, so that manufacturing costs of the hub body are high.

SUMMARY OF THE INVENTION

Starting from this problem, it is an object of the present invention to provide a hub body that can be produced simply and economically, without suffering any impairment to its long-term strength properties.

Pursuant to this object, and others which will become apparent hereafter, one aspect of the present invention resides in selecting, the hardness curve in the shoulder or in the elements of the external toothing so that it rises in the axial direction, relative to a constant axial plane, from a minimum value to a maximum value and then declines again. The hardness curve declines, relative to a constant radial plane, from a maximum value on the radial inside to a minimum value on the radial outside.

Pursuant to the invention, a hub body is provided that has a outer contour with a smooth surface, to which the take-along disk is directly attached. The fact that the hardness curve in the outer contour rises in the axial direction, relative to a constant axial plane, from a minimum value to a maximum value and declines again, and the hardness curve declines, relative to a constant radial plane, from a maximum value on the radial inside to a minimum value on the radial outside. This makes it possible to adjust the strength of the hub body to the load that acts upon it during operation.

Because the hardness curve (strength curve) is no longer uniform throughout the component, the hub body can be produced by cold pressing in a single work step. Thus, it is possible to dispense with the previously conventional forging of a crude part and subsequent tempering, as well as with turning, boring and external and internal clearing of the toothing. Compared to the known hub body, the production costs are reduced considerably.

To further adjust the hub body to the individual load, it is also advantageous for the hardness curve in the base body to rise in the axial direction, relative to a constant axial plane, from a minimum value to a maximum value and then decline again.

It is advantageous for the hardness curve between two elements to rise in the axial direction, relative to a constant axial plane, from a minimum value to a maximum value and to decline again, and for the hardness curve to assume its maximum value, relative to a constant radial plane, between the radial inside and the radial outside. This measure means that the strength of the hub body is also adjusted to the load acting upon it in subsequent operation in the spaces between the elements.

Preferably, the hardness between two elements is greater, relative to a constant radial plane, on the radial inside than on the radially outside. It is especially advantageous when maximum hardness, relative to a constant radial plane, occurs in the area of the component middle, i.e., in the area of the middle radius.

Hardness (strength) is preferably highest in the teeth of the internal toothing, because these are exposed to the highest load.

To withstand the surface pressure during operation, hardness is greatest in the flanks of the elements. It is advantageous when the hardness curve in the elements runs in substantially symmetrical fashion, relative to a constant radial plane, from its maximum value in the flanks to the minimum value in the middle of the elements. This brings the advantage that the extrusion tool can be embodied symmetrically.

In another embodiment the running-in and the running-out regions of the internal toothing are rounded in the axial direction. As a result, subsequent assembly of the clutch disk is simplified.

The elements described above are preferably the teeth of an internal toothing. In this way, the hub body retains its previously known form, so that it is adapted to already existing structural elements (take-along disk) and can be substituted or used as a spare part.

When the hub body experiences no radial change over its axial length and thus has only one outer contour, which possesses a suitable hardness curve, it is possible to weld the take-along disk to the outer contour. Preferably, a low energy welding process such as laser welding, friction welding, or capacitive discharge welding is used, whereby the geometry at the weld point must be adapted to the particular welding process.

To embody a contour that is similar to an external toothing, the shoulder can be designed with a polygonal cross-section.

Pursuant to a further embodiment of the invention, the hub body is produced by the cross-extrusion process. Suitable precision in tool production allows the hardness curve to be established to be determined reproducibly in advance.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawings show:

FIG. 2 is an axial section through the hub body in FIG. 1;

FIG. 2a is the hardness curve, relative to the constant axial plane $E_{A1}$, in the hub body through a tooth as in Section IIab in FIG. 1;

FIG. 2a1 is the hardness curve, relative the constant axial plane $E_{A2}$, in the hub body through a tooth as in Section IIab as in FIG. 1;

FIG. 2a2 is the hardness curve, relative to the constant axial plane $E_{A3}$, in the hub body through a tooth as in Section IIab in FIG. 1;

FIG. 2b is the hardness curve in the hub body within a tooth along a constant radial plane as in Section IIab in FIG. 1;

FIG. 2c is the hardness curve in the hub body between two teeth along a constant axial plane as in Section IIcd in FIG. 1;

FIG. 2d is the hardness curve in the hub body between two teeth along a constant radial plane as in Section IIcd in FIG. 1;

DETAILED DESCRIPTION OF THE PRESENTLY PREFERRED EMBODIMENTS

Figure 1:
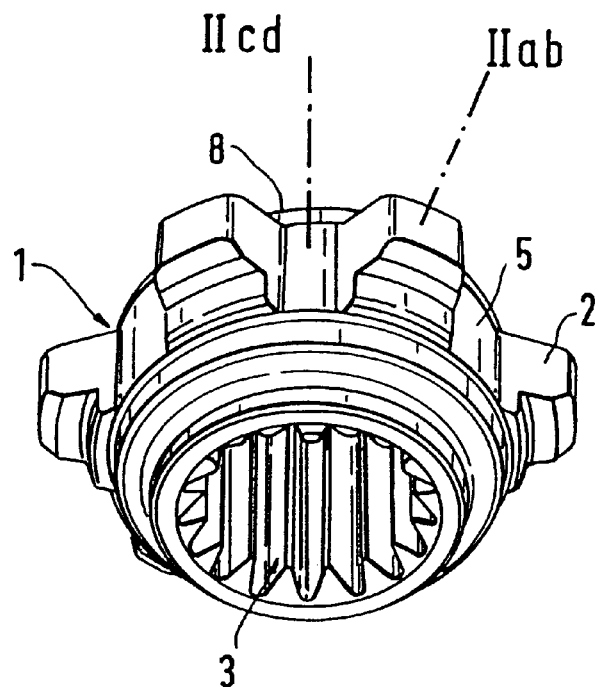
FIG. 1 is a perspective view of a hub body equipped with external toothing, pursuant to the present invention.
Figure 3:
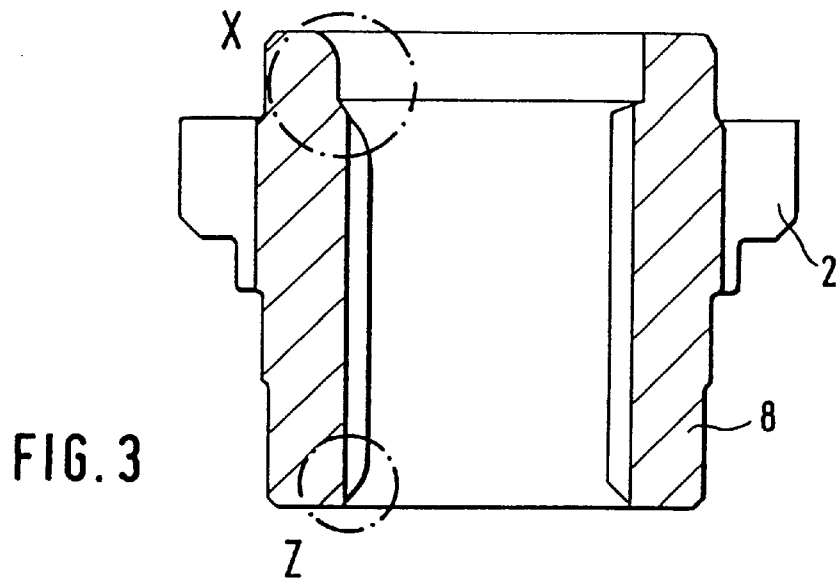
FIG. 3 is different axial section of the hub body as in FIG. 1.
Figure 3A:
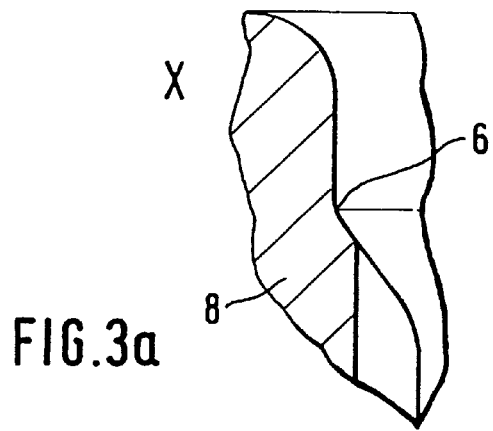
FIG. 3a is the Detail X of FIG. 3.
Figure 3B:
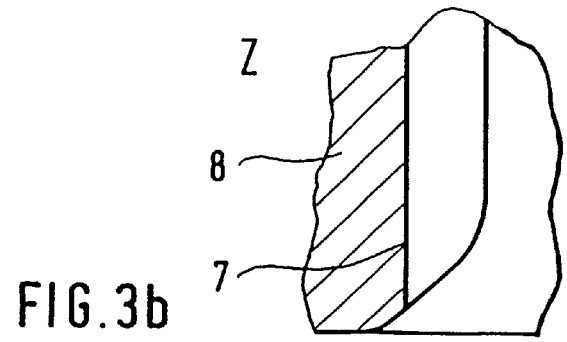
FIG. 3b is the Detail Z of FIG. 3.

The hub body shown in FIG. 1 is embodied in the form of a sleeve and is equipped with external toothing 1 and an internal toothing 3. The teeth 2 of the external toothing 1 are embodied in graduated fashion in one axial direction of the hub body. The sleeve-type base body 8 is also graduated in the axial direction. As FIG. 1 shows, the area 5 (tooth space) between two teeth 2 of the external toothing 1 has a larger diameter than the base body 8, so that the external toothing 1 comprising the teeth 2 and the tooth spaces 5 is elevated in annular fashion relative to the base body 8. As FIGS. 3a and 3b show, both the running-in 6 and the running-out 7 regions to the internal toothing 3 are rounded in the axial direction, so that an edge-free transition to the internal toothing 3 is established.

Figure 1A:
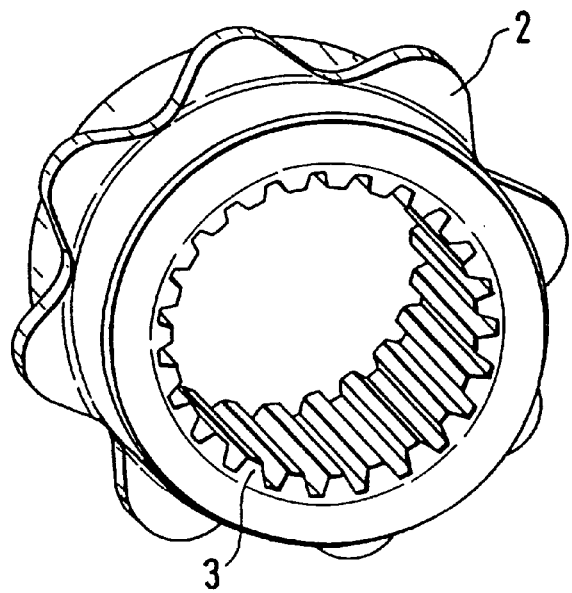
FIG. 1a is a perspective view of a hub body equipped with a sine-shape profile (polygon) on its external periphery.

The hub body shown in FIG. 1a is also embodied as a sleeve and equipped with the internal toothing 3. Instead of external toothing, a sine-shaped or polygonal profile is embodied on the hub body. Such a hub body is used with a clutch that does not have an idle damper. In this case, the center disk is connected without clearance in the circumferential direction to the hub body and is equipped with a complementary profile. The hardness or strength curve in the hub body is the same in both embodiments.

FIGS. 2a to 2d show the hardness curve, relative to a constant radial or axial plane, in the hub body. For the sake of clarity, the values of Vickers hardness are indicated for the hardness curve.

FIG. 2 shows an axial section through the hub body. The right side of the drawing shows the section at the level of a tooth 2, while the left side shows the section at the level of a tooth space 5. Relative to a constant axial plane ($E_{A1}$, $E_{A2}$, $E_{A3}$), the hardness curve in the teeth 2 rises in the axial direction from a minimum value (253) to a maximum value (263) and then declines again to a lower value (244), as FIG. 2a shows. As FIG. 2b shows, the hardness curve in the teeth 2 declines, relative to a constant radial plane (ERZ), from its maximum value (292) on the radial inside to its minimum value (227) on the radial outside. Because the selected measurement points for the hardness data are separated from each other, the diagrams in FIGS. 2a to 2d are graduated.

A comparison of FIGS. 2a, 2a1 and 2a2, which show the hardness curve on different planes, whereby FIG. 2a shows the hardness curve on plane ($E_{A1}$), FIG. 2a1 shows the hardness curve on plane ($E_{A2}$), and FIG. 2a2 shows the hardness curve on plane ($E_{A3}$), illustrates that the hardness curve rises in the axial direction from a minimum value to a maximum value and then declines to a lower value. In each case, the hardness rises in the direction of the outer radius.

FIG. 2c illustrates that the hardness curve in a tooth space 5 rises, relative to a constant axial plane ($E_{AL}$), from a minimum value (224) to a maximum value (268) and declines to a lower value (246). Relative to a constant radial plane ($E_{RL}$), the hardness is higher (270) at the radial inside than at the radial outside (256). The maximum radial hardness (278/279) occurs in the region of the middle radius, i.e., at approximately the center of the sleeve-type body 8. A comparison of the hardness values in FIG. 2 shows that the hardness is greatest in the teeth of the internal toothing 3.

Figure 4:
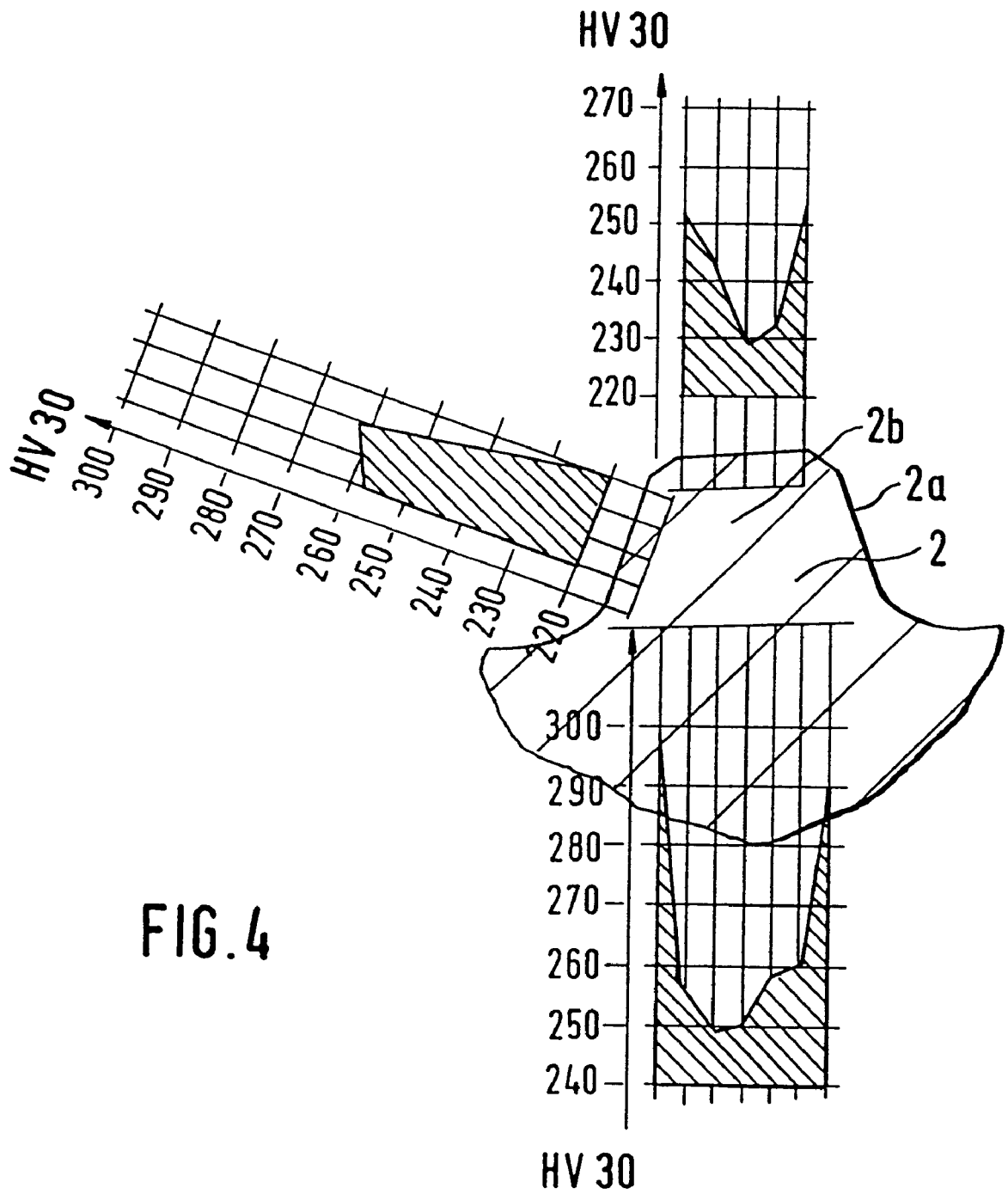
FIG. 4 is the hardness curve in an external tooth, in reference to Section IV—IV of FIG. 3.

FIG. 4 shows the hardness curve in a tooth 2 of the external toothing 1. It is clear that the maximum hardness occurs in the tooth flank 2a. Relative to the circumferential direction, the hardness curve is substantially symmetrical to the tooth center 2b, where the minimum is established.

Figure 5:
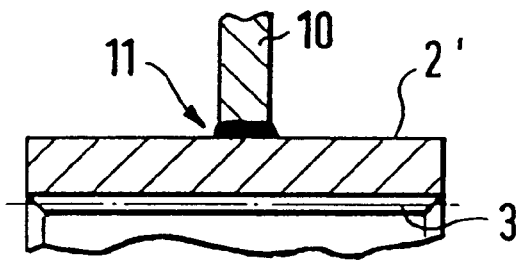
FIG. 5 is an upper axial section through a hub body with an outer contour unchanged in the axial direction.

FIG. 5 shows a sleeve-type hub body, whose outer contour 2' is unchanged in the axial direction. During operation, the maximum load occurs directly on the outer contour 2'. The hub body is connected to a take-along disk 10 by welding, preferably by a low-energy welding process, e.g., laser welding, friction welding or capacitor discharge welding. The geometry at the weld point 11 is matched to the particular welding process.

Figure 6:
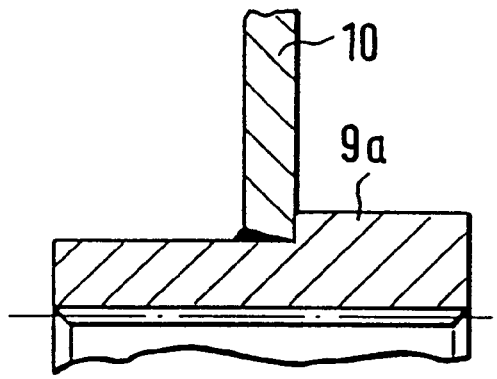
FIGS. 6–13 show different embodiments of a hub body for various connections of the center disk thereto.

In the embodiment of the hub body shown in FIG. 6, there is an encircling shoulder 9a, which forms a band that serves as the stop for the take-along disk 10. Here, too, the take-along disk 10 is welded to the hub body.

Figure 7:
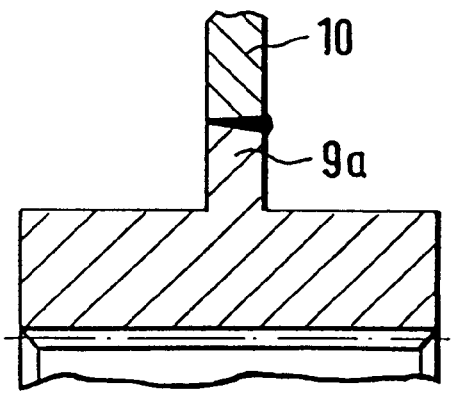

In the embodiment shown in FIG. 7, the encircling shoulder 9a forms a flange on the hub body, which constitutes a transition to the take-along disk 10.

Figure 8:
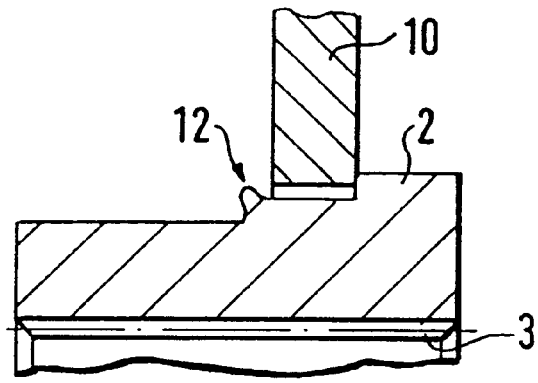

In the embodiment shown in FIG. 8, the transmission of torque from the hub body to the take-along disk 10 occurs via the external toothing 1, whereby a radial elevation is provided in the tooth 2, against which the take-along disk 10 strikes. For axial securing, material is peened radially outward at the point 12. Axial securing by means of a pressure connection is also conceivable. Instead of transmitting the torque via an external toothing, a knurl or polygon profile can be provided. Transmission of torque through an asymmetrical outer contour is also conceivable.

Figure 9:
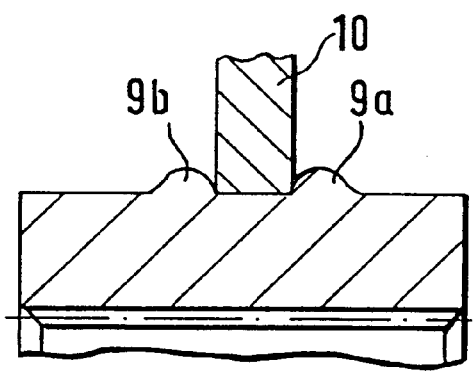

In the embodiment shown in FIG. 9, there are two radial shoulders 9a, 9b, which form a warpage of the outer contour 2' of the hub body. A pressure connection is established for the take-along disk 10 when it is located between the two shoulders 9a, 9b. Torque is transmitted via the pressure connection.

Figure 10:
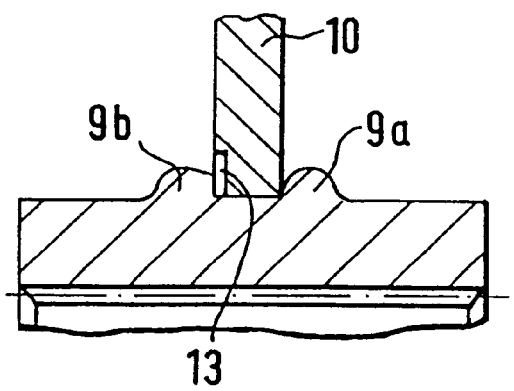
Figure 11:
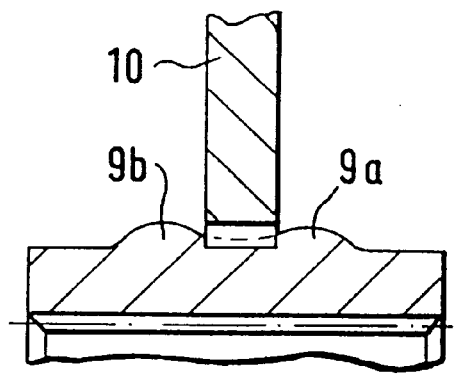
Figure 12:
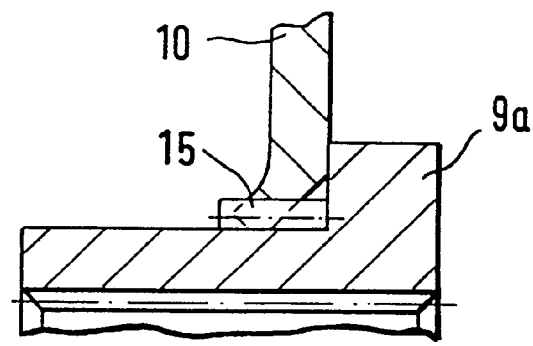
Figure 13:
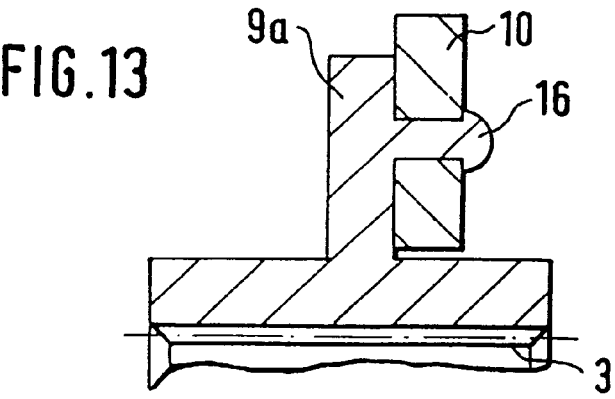

As FIG. 10 shows, axial pockets 13 can also be pressed into the take-along disk 10 for the purpose of torque transmission. As FIG. 11 shows, instead of axial pockets 13, radial pockets 14 can be provided. Suitably shaped elastic elements 15 of the take-along disk 10 can also lock into pockets in the hub body for the purpose of transmitting torque from the hub body to the take-along disk 10. When the radial shoulder 9a forms a flange, as FIG. 13 shows, the take-along disk 10 can be connected by peening or riveting a journal 16 to the hub body.

The hub body is preferably produced by cross-extrusion. This process permits establishment of the hardness values adjusted to the load that acts on the hub body during operation. Cross-extrusion is usually a cold deformation process, in which the deformation direction of the crude piece placed in the pressing tool is at a right angle to the force initiation direction. The material flow is controlled and the hardness (strength) is adjusted by means of tool design. Strong deformation results in high hardness values and weaker deformation results in accordingly lower hardness values. The cross-extrusion process is known to those skilled in the art, see German reference 28 19 167 A1, thus no detailed explanation is needed here.

The invention is not limited by the embodiments described above which are presented as examples only but can be modified in various ways within the scope of protection defined by the appended patent claims.

I claim:

1. A hub body for a clutch, comprising: an internal toothing connectable to a gear input shaft; and at least one radially outwardly extending member connectable to a take-along disk of the clutch, the radially extending member having a hardness curve that rises in an axial direction of the hub body, relative to a constant axial plane, from a minimum value to a maximum value and declines again, and the hardness curve declining, relative to a constant radial plane, from a maximum value on a radial inner side to a minimum value on a radial outer side.

2. A hub body for a clutch, comprising: a tubular base body having an internal toothing connectable to a gear input shaft; and an outer contour attachable to a take-along disk, the outer contour being configured to have a hardness curve that rises in the axial direction, relative to a constant axial plane, from a minimum value to a maximum value and declines again, the hardness curve declining, relative to a constant radial plane, from a maximum value on a radial inner side to a minimum value on a radial outer side.

3. A hub body as defined in claim 1, wherein the at least one radially outwardly extending member is at least one shoulder that extends radially outward.

4. A hub body as defined in claim 1, wherein the at least one radially outwardly extending member is a plurality of elements circumferentially spaced from one another and arranged to extend radially and axially.

5. A hub body as defined in claim 4, wherein the elements are configured so that the hardness curve between two of the elements rises in the axial direction, relative to a constant axial plane, from a minimum value to a maximum value and declines again, and the hardness curve assumes its maximum value, relative to a constant radial plane, between a radial inner side and a radial outer side of the elements.

6. A hub body as defined in claim 5, wherein the elements are configured so that hardness between the two elements is higher, relative to a constant radial plane, on the radial inner side than on the radial outer side.

7. A hub body as defined in claim 5, wherein the elements are configured so that hardness, relative to a constant radial plane, occurs in a area of a middle radius of the elements.

8. A hub body as defined in claim 1, wherein the hardness is greatest in teeth of the internal toothing.

9. A hub body as defined in claim 5, wherein the elements each have a flank, the hardness being greatest in the flank of the elements.

10. A hub body as defined in claim 9, wherein the hardness curve in the elements runs substantially symmetrically, relative to a constant radial plane, from its maximum value in the flank of the elements to its minimum value in a middle of the elements.

11. A hub body as defined in claim 1, wherein the internal toothing has a running-in region and a running-out region that are rounded in the axial direction.

12. A hub body as defined in claim 1, and further comprising a base body having a hardness curve that rises in the axial direction, relative to a constant axial plane, from a minimum value to a maximum value and declines again.

13. A hub body as defined in claim 2, and further comprising a base body having a hardness curve that rises in the axial direction, relative to a constant axial plane, from a minimum value to a maximum value and declines again.

14. A hub body as defined in claim 4, wherein the elements are teeth of an external toothing.

15. A hub body as defined in claim 2, wherein the take-along disk is welded to the outer contour.

16. A hub body as defined in claim 3, wherein the shoulder has a polygonal cross-section.

17. A hub body as defined in claim 1, wherein the hub body is formed by cross-extrusion.

* * * * *